US010338886B2

(12) United States Patent
Hashimoto (10) Patent No.: US 10,338,886 B2
(45) Date of Patent: Jul. 2, 2019

(54) INFORMATION OUTPUT SYSTEM AND INFORMATION OUTPUT METHOD (71) Applicant: HONDA MOTOR CO., LTD., Tokyo (JP)

(72) Inventor: Masayuki Hashimoto, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 65 days.

(21) Appl. No.: 15/622,312

(22) Filed: Jun. 14, 2017

(65) Prior Publication Data

US 2017/0371619 A1 Dec. 28, 2017

(30) Foreign Application Priority Data

Jun. 23, 2016 (JP) .................................. 2016-124995

(51) Int. Cl.
| | |
|---|---|
| *G06F 3/16* | (2006.01) |
| *B60R 16/037* | (2006.01) |
| *G01C 21/36* | (2006.01) |
| *G06F 3/147* | (2006.01) |
| *G06T 11/60* | (2006.01) |
| *G09G 5/12* | (2006.01) |

(52) U.S. Cl.
CPC ............ *G06F 3/167* (2013.01); *B60R 16/037* (2013.01); *G01C 21/3605* (2013.01); *G01C 21/3667* (2013.01); *G06F 3/147* (2013.01); *G06T 11/60* (2013.01); *G09G 5/12* (2013.01); *G06T 2200/24* (2013.01); *G09G 2354/00* (2013.01); *G09G 2370/022* (2013.01); *G09G 2380/10* (2013.01)

(58) Field of Classification Search
CPC .................................. G06F 3/167; G06F 3/147
See application file for complete search history.

(56) References Cited

U.S. PATENT DOCUMENTS

| 9,789,763 B1* | 10/2017 | Khoo | ...................... B60K 35/00 |
| 2013/0167013 A1* | 6/2013 | Poliak | ................. G06F 3/04886 715/235 |
| 2015/0077272 A1* | 3/2015 | Pisz | ....................... B60K 37/06 340/905 |
| 2015/0232065 A1* | 8/2015 | Ricci | ....................... B60R 25/01 701/36 |
| 2016/0138931 A1* | 5/2016 | Kang | ................... G01C 21/362 701/533 |

(Continued)

FOREIGN PATENT DOCUMENTS

WO WO 2013/080375 A1 6/2013

*Primary Examiner* — David E Choi
(74) *Attorney, Agent, or Firm* — Squire Patton Boggs (US) LLP (57) ABSTRACT

An information output system includes an output unit (25) configured to output information, an information recognizing unit (212) configured to recognize first information according to designation operation by a user, and an output control unit (211) configured to cause, on condition that a present OFF period of a moving body (3) is started, the output unit (25) to output, in a form recognizable by the user, an interface for requesting an input of second information that should be associated with the first information recognized after a start of a present ON period of the moving body (3) and information indicating one or both of the location and the time point.

12 Claims, 10 Drawing Sheets (56) References Cited

U.S. PATENT DOCUMENTS

| | | | | |
|---|---|---|---|---|
| 2016/0169688 A1* | 6/2016 | Kweon | ............... | G08G 1/087 |
| | | | | 701/522 |
| 2016/0274717 A1* | 9/2016 | Wako | ............... | G06F 3/0488 |
| 2016/0313868 A1* | 10/2016 | Weng | ............... | G06F 3/017 |
| 2017/0075366 A1* | 3/2017 | Esselink | ............... | G05B 15/02 |
| 2017/0336870 A1* | 11/2017 | Everett | ............... | G06F 3/0383 |
| 2017/0371619 A1* | 12/2017 | Hashimoto | ............... | B60R 16/037 |

* cited by examiner

INFORMATION OUTPUT SYSTEM AND INFORMATION OUTPUT METHOD

BACKGROUND OF THE INVENTION

Field of the Invention

The present invention relates to an information output system and an information output method.

Description of the Related Art

There has been proposed a system capable of collecting an intention of a driver of a vehicle.

For example, there has been proposed a vehicle that transmits, according to depressing operation of a Like button or a Dislike button assembled to a steering wheel, a spot where the button is depressed and indication that the button is depressed (the "Like button" is depressed) to an information providing center (see International Publication No. WO 2013/080375 (Patent Literature 1)).

A server of the information providing center disclosed in Patent Literature 1 transmits, after receiving the indication that the button is depressed, a query including an answer form for checking a reason for the depressing operation of the button to an SNS (Social Networking Service) account of a user.

However, in the technique disclosed in Patent Literature 1, if the query or indication that the query is received is notified to a terminal used by the user during driving of the user, the user is likely to feel annoyed. On the other hand, if the query or the indication that the query is received is not notified to the user, time elapses while the user does not notice that the query is transmitted to the SNS. Therefore, the user is likely to forget the reason for the depressing operation and feel annoyed.

SUMMARY OF THE INVENTION

In view of such problems, an object of the present invention is to provide an information output system and an information output method that can request the user to input additional information of information acquired during driving while reducing or eliminating annoyance of a user.

An information output system according to the present invention includes: an output unit configured to output information; an information recognizing unit configured to recognize, according to designation operation by a user, first information and one or both of a location where and a time point when the user recognizes the first information; and an output control unit configured to cause, on condition that a present OFF period of a moving body is started, the output unit to output, in a form recognizable by the user, an interface for requesting an input of second information that should be associated with the first information recognized after a start of a present ON period of the moving body and information indicating one or both of the location and the time point.

With the information output system having such configuration, the request for the input of the second information that should be associated with the first information is avoided in an ON period of the moving body when it is highly probable that the user is driving the moving body. Therefore, the user is prevented from feeling annoyed. In addition, the interface for requesting the input of the second information is output after the start of the present OFF period when it is highly probable that the user has finished the driving of the moving body. Therefore, it is possible to request the input of the second information in a period when it is highly probable that the user remembers the second information that should be associated with the first information. Consequently, it is possible to prevent the user from feeling annoyed.

As explained above, with the information output system according to the present invention, it is possible to request, while reducing or eliminating annoyance of the user, the user to input the second information that should be associated with the first information recognized in the period when it is highly probable that the user is driving the moving body.

With the information output system according to the present invention, one or both of the location and the time point are output together with the interface for requesting the input of the second information.

Consequently, it is possible to cause the user to relatively easily recall a situation at the time when the user performed the designation operation. In addition, it is possible to urge the user to input the second information having high quality.

In the information output system according to the present invention, it is preferable that the output control unit outputs, to the output unit, together with the interface for requesting the input of the second information, an image in which an image associated with the first information is superimposed and displayed at a position on a map corresponding to the location where the first information was recognized.

With the information output system having the configuration, the image associated with the first information is superimposed and displayed at the position on the map corresponding to the location where the user recognizes the first information. Therefore, it is possible to cause the user to more easily recall the situation at the time when the user performed the designation operation. In addition, it is possible to urge the user to input the second information having higher quality.

In the information output system according to the present invention, it is preferable that the output control unit outputs, to the output unit, together with the interface for requesting the input of the second information, an image indicating a start time point of the ON period, a start time point of the OFF period, and the time point when the first information was recognized.

With the information output system having the configuration, the image indicating the start time point of the ON period, the start time point of the OFF period, and the time point when the first information was recognized, is output. Therefore, it is possible to cause the user to more easily recall the situation at the time when the user performed the designation operation. In addition, it is possible to urge the user to input the second information having higher quality.

In the information output system according to the present invention, it is preferable that the output control unit causes the output unit to output, at the start of the present ON period of the moving body, an evaluation by another person concerning the first information recognized after a start of a previous ON period of the moving body.

With the information output system having the configuration, it is possible to cause the user to recognize, during the start of the present ON time of the moving body, the evaluation by the other person concerning the first information recognized according to the designation operation by the user after the start of the previous ON period of the moving body.

The user who obtains the evaluation by the other person is easily conscious of performing the designation operation for a certain period of time. As a result, it is possible to urge the user to execute the designation operation even during the present ON period of the moving body.

In the information output system according to the present invention, it is preferable that the information recognizing unit recognizes, together with the first information, the location where the first information was recognized, and, when the present ON period of the moving body is started, the output control unit superimposes the first information and the evaluation by the other person in a position on a map corresponding to the location and outputs to the output unit.

With the information output system having the configuration, the first information and the evaluation by the other person are superimposed at the position on the map corresponding to the location where the user recognizes the first information. Therefore, it is possible to cause the user to relatively easily recall the situation at the time when the user performed the designation operation.

Consequently, it is possible to cause the user to be conscious of how the designation operation in what kind of a situation is evaluated by the other person.

In the information output system according to the present invention, it is preferable that the moving body includes a driving-operation detecting unit configured to detect driving operation, and a moving-body input unit disposed in a position where the user can operate when performing the driving operation and configured to detect operation by the user, and the designation operation is an operation with respect to the moving-body input unit.

With the information output system having the configuration, the user can relatively easily perform the designation operation even while the user is driving the moving body. Consequently, in execution of the designation operation, it is possible to prevent the user who is driving the moving body from feeling annoyed.

In the information output system according to the present invention, it is preferable that the first information is sound recorded or a still image or a moving image photographed according to the designation operation, and the output control unit is configured to output, together with the interface for requesting the input of the second information, the first information automatically or according to operation by the user.

With the information output system having the configuration, the first information having a relatively larger information amount is recognized by the designation operation. Consequently, in the recognition of the first information, the user recognizes information having a large information amount without performing operation more complicated than the designation operation.

The first information is output automatically or according to the operation by the user. Therefore, it is possible to cause the user to relatively easily recall the situation at the time when the user performed the designation operation.

Consequently, when the interface for requesting the input of the second information is output, it is possible to cause the user to relatively easily recall the situation at the time when the user performed the designation operation. Therefore, it is possible to urge the user to input additional information having high quality.

In the information output system according to the present invention, it is preferable that the information recognizing unit recognizes, separately from the designation operation, third information different from the first information, and the interface for requesting the input of the second information includes an interface for requesting association of the first information and the third information.

Operation is sometimes easier when association of existing information is performed than when inputting new information. With the information output system having the configuration configured in view of this point, the interface for requesting the input of the second information includes the interface for requesting the association of the first information and the third information. Therefore, it is possible to cause the user to relatively easily input the second information.

In the information output system according to the present invention, it is preferable that the information recognizing unit recognizes a plurality of the first information according to the designation operation, and the interface for requesting the input of the second information includes an interface for requesting association of each of the plurality of the first information.

With the information output system having the configuration, the interface for requesting the input of the second information includes the interface for requesting the association of each of the first information. Therefore, it is possible to cause the user to relatively easily input the second information.

The information output system according to the present invention may further include an ignition switch sensor which outputs a signal indicating on or off of an ignition switch of the moving body, wherein the output control unit is configured to recognize a start of an off period or a start of an on period based on the output of the ignition switch sensor.

In the information output system according to the present invention, the first information may be a sound recorded, and the second information may be a title of the sound recorded or information identifying a sharing destination of the sound recorded.

An information output method according to the present invention is a method executed by a system including an output unit configured to output information. The information output method includes: an information recognizing step for recognizing, according to designation operation by a user, first information and one or both of a location where and a time point when the first information was recognized; and an output control step for causing, on condition that a present OFF period of a moving body is started, the output unit to output, in a form recognizable by the user, an interface for requesting an input of second information that should be associated with the first information recognized after a start of a present ON period of the moving body and information indicating one or both of the location and the time point.

DETAILED DESCRIPTION OF THE PREFERRED EMBODIMENTS

Configuration of a Server Client System

Figure 1:
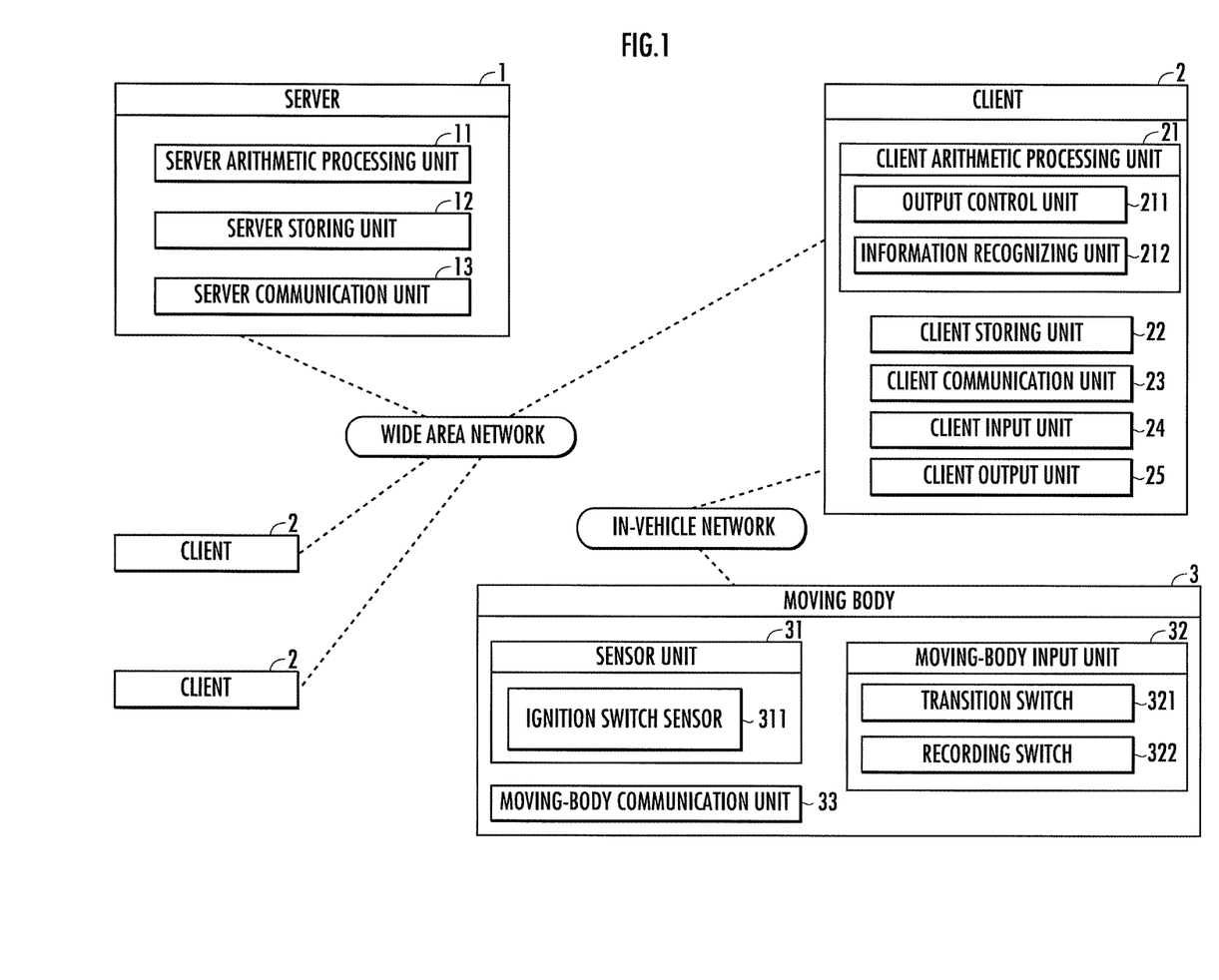
FIG. 1 is an overall configuration diagram of an information output system.

An information output system according to an embodiment of the present invention shown in FIG. 1 is configured by a server 1 and a plurality of clients 2 functioning as mobile stations. The server 1 and the respective plurality of clients 2 are capable of communicating with each other via one or a plurality of networks. The clients 2 are configured by information terminals carried by users. The clients 2 may be temporarily or permanently mounted on moving bodies, which are apparatuses having a function of moving according to driving operation by the users, such as vehicles including a four-wheeled vehicle, a two-wheeled vehicle, and a bicycle.

Configuration of the Server

The server 1 is a server that provides an SNS (Social Networking Service). The server 1 is configured by a computer functioning as a fixed station. The server 1 includes a server arithmetic processing unit 11, a server storing unit 12, and a server communication unit 13. Note that the server 1 may be configured by a portable terminal apparatus such as a smartphone or a tablet functioning as a mobile station.

The server arithmetic processing unit 11 is configured by an arithmetic processing unit (a CPU) that reads, according to necessity, software and data from a designated region of a memory configuring the server storing unit 12 and then executes, on the data, designated arithmetic processing conforming to the software, and by a communication apparatus, a storage (a memory), and the like according to necessity.

The server storing unit 12 stores and retains road traffic information and server map information. The "road traffic information" includes moving costs of each link. The "server map information" includes link identification information for identifying each link and data representing attributes besides rows of coordinate values ((latitude and longitude) or (latitude, longitude, and altitude)) of positions, shapes, postures, and the like of each link configuring a road. The links are connected by nodes.

The server storing unit 12 is configured to store first information received from the clients 2 of each of the members, post date and time of the first information, titles of the first information, post destinations of the first information, location information associated with the first information, and evaluations (e.g., the number of "likes") by other persons of the first information.

The server communication unit 13 is configured by a communication device that is connected to a public communication network functioning as a network and communicates with external terminals such as the clients 2.

Configuration of the Client

The client 2 is configured by a portable terminal apparatus such as a smartphone or a tablet functioning as a mobile station. The "portable" means that, for example, the size of the terminal apparatus is approximately the size of a standard palm of the human and the weight of the terminal apparatus is approximately weight for enabling a user to hold the terminal apparatus with one hand or carry the terminal apparatus in a pocket of clothes or the like. The client 2 may be configured by an apparatus (e.g., an apparatus assembled to a moving body) having size and weight larger than the size and the weight of the portable device.

Note that, in the following explanation, a user of the client 2 to be explained is referred to as "user" and a user of an SNS including the user is referred to as "member".

The client 2 includes a client arithmetic processing unit 21, a client storing unit 22, a client communication unit 23, a client input unit 24, and a client output unit 25.

The client arithmetic processing unit 21 is configured by a processor such as a CPU (Central Processing Unit). The client arithmetic processing unit 21 reads a predetermined program (an SNS application) from the memory or the like and executes the program to thereby function as an output control unit 211 and an information recognizing unit 212 that execute arithmetic processing explained below.

The client arithmetic processing unit 21 is configured to measure or detect the present position of the client 2 in time series. The present position of the client 2 is measured on the basis of an output signal of a gyro sensor according to necessity besides a signal received from an artificial satellite by a GPS receiver. The client arithmetic processing unit 21 is configured to transmit "probe information" representing a time-series change form of the position of the client 2 to the server 1.

The client arithmetic processing unit 21 is configured to transmit a "route search request" to the server 1 and receive "server route information" corresponding to the "route search request" from the server 1. The client arithmetic processing unit 21 is configured to search for, on the basis of the server route information, a client route using client map information and output the client route to the client output unit 25.

The client storing unit 22 is configured to store and retain reception information and an arithmetic processing result such as a calculation result by the client arithmetic processing unit 21. The client storing unit 22 is configured to store the client map information, contents, and the like. The "client map information" includes coordinate rows representing the positions, the shapes, the postures, and the like of each link configuring the road and the link identification information for identifying each link.

The client map information may not include the coordinate rows and may include image information for causing the client output unit 25 to display a map and link identification information of each link configuring a road included in the map. In this case, coordinate values coinciding with coordinate values included in probe information or request information among the coordinate values included in the server map information are specified by the server 1, whereby link identification information, road type, or the like corresponding to the specified coordinate values may be specified.

Specifications and data structures of the client map information and the server map information are different. Therefore, even if definitions of the coordinate rows and the like in each map information are different, matching of the links is enabled by adding common link identification information to the same links. The server 1 transmits the server route information including the link identification information. The client 2 displays, through the client output unit 25, an image of a navigation route including a plurality of links identified by the link identification information included in the server route information.

The client storing unit 22 may store the first information and the like contributed by the members and periodically downloaded from the server 1.

The client communication unit 23 is configured by a communication device that is connected to a public communication network functioning as a wide area network and communicates with an external terminal such as the server 1, and a communication device that is connected to an in-vehicle network and communicates with a moving body 3.

The client input unit 24 is configured by operation buttons and a microphone and enables various kinds of operation or input setting by the user operation or utterance. The client output unit 25 is configured by a display device and an acoustic output device (a speaker) and displays image contents such as the client map information or outputs acoustic contents. The client input unit 24 and the client output unit 25 may be configured by a touch panel display.

A constituent element of the present invention "outputting" information means that the information is output in all forms that the human can recognize through the five senses including the visual sense, the auditory sense, and the tactile sense of the human such as display, sound output, and vibration output of the information. A constituent element of the present invention "being configured" to execute arithmetic processing in charge means that the constituent element has a function of reading necessary program and data from the memory and then executing the arithmetic processing according to the program on the basis of the data, and further being programmed to do so.

Configuration of the Moving Body

The moving body 3 is a moving body such as a vehicle configured to enable the user of the client 2 to ride while carrying the client 2. The moving body 3 includes a sensor unit 31, a moving-body input unit 32, and a moving-body communication unit 33.

The sensor unit 31 includes an ignition switch sensor 311 that outputs a signal indicating ON or OFF of an ignition switch of the moving body 3. The sensor unit 31 may include a position sensor such as a GPS (Global Positioning System), a speed sensor, and a gyro sensor in addition to or instead of the ignition switch sensor 311.

The moving-body input unit 32 includes a transition switch 321 and a recording switch 322 provided in a steering wheel of the moving body 3. Instead of including the switches, the moving-body input unit 32 may be provided in, for example, a range in which the fingers reach the moving-body input unit 32 while holding the steering wheel.

The moving-body communication unit 33 is configured by a communication device that is connected to the in-vehicle network and communicates with the client 2. The moving-body communication unit 33 is configured to transmit output signals of the sensor unit 31 and the moving-body input unit 32 to the client 2.

(SNS Display Processing)

SNS display processing executed by the client 2 is explained with reference to FIGS. 2 to 8.

Figure 2:
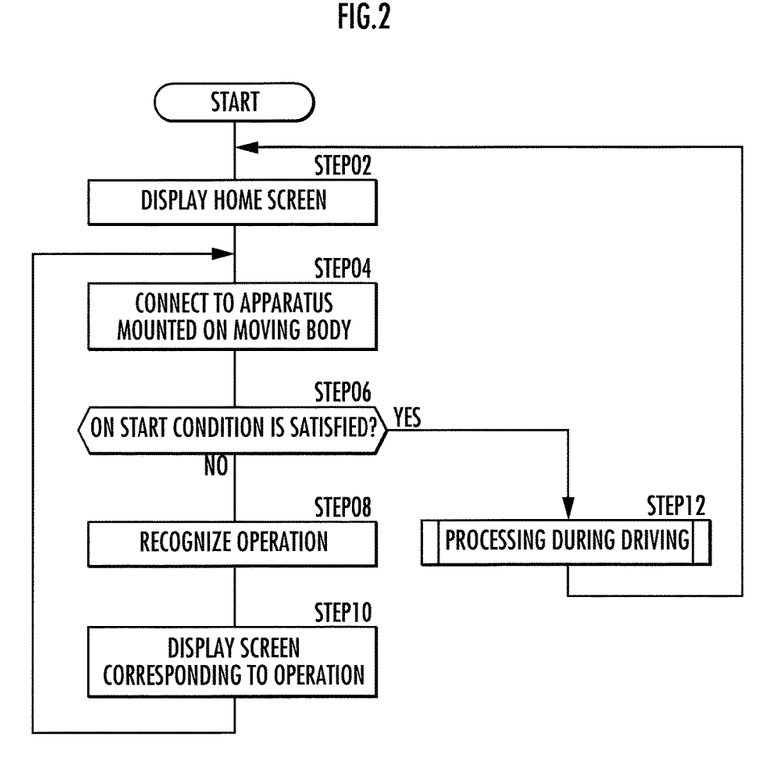
FIG. 2 is a flowchart of SNS display processing.
Figure 3:
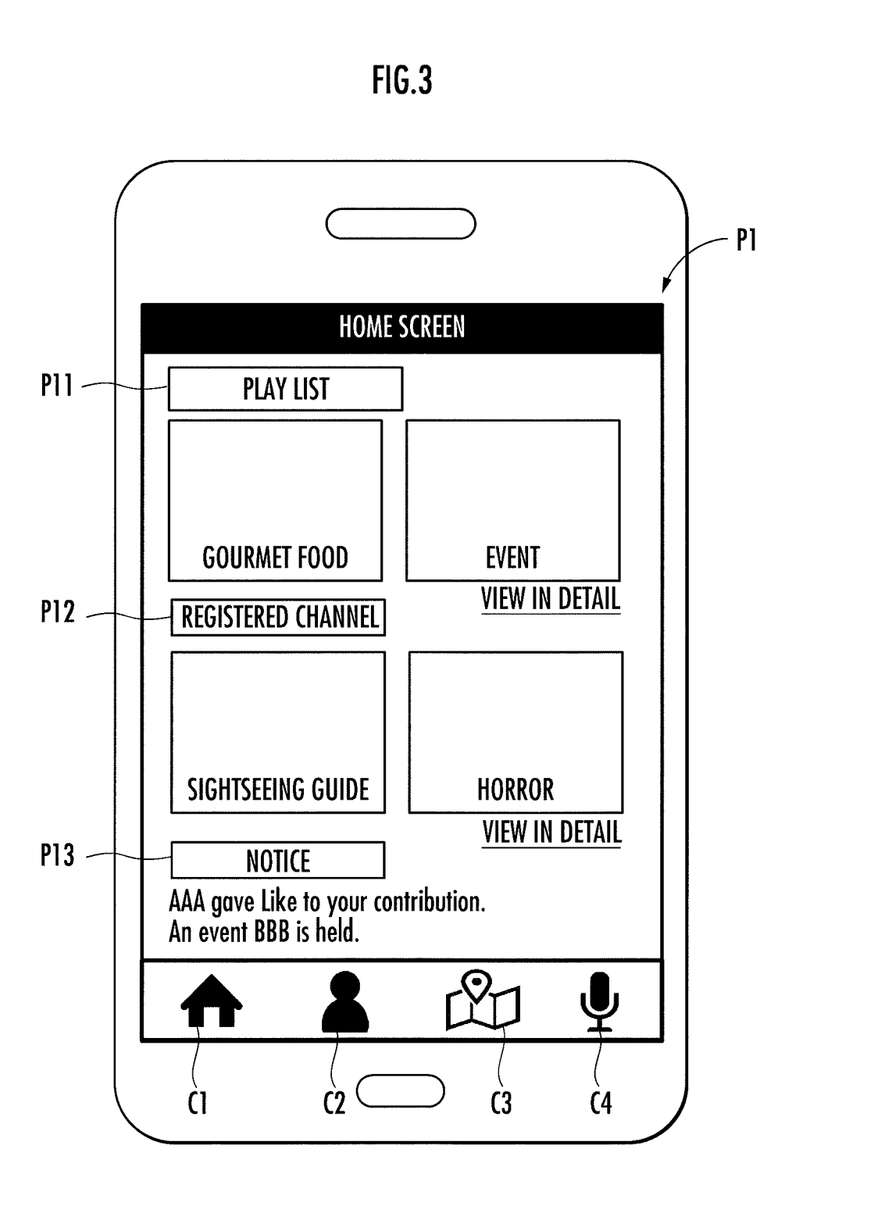
FIG. 3 is a diagram illustrating the configuration of a home screen.

When an SNS application installed in the client 2 is executed, the output control unit 211 outputs a home screen P1 shown in FIG. 3 to the client output unit 25 (FIG. 2/STEP 02).

The home screen P1 includes play list display P11, registered channel display P12, and notice display P13. A home button C1, a my page button C2, a map button C3, and a recording switch C4 are included in a lower part of the home screen P1.

The play list display P11 is list display of contents of general themes such as a gourmet food or an event.

The registered channel display P12 is list display of contents registered by the user of the client 2.

The notice display P13 is display including notice of recent actions of the other members to a post of the user such as "AAA gave Like to your post" or notice of recent incidents including recent events such as "an event BBB is held".

The home button C1 is a button for transitioning to the home screen P1 (FIG. 3). When the home button C1 is depressed on the home screen P1, an updated home screen P1 is displayed.

Figure 4:
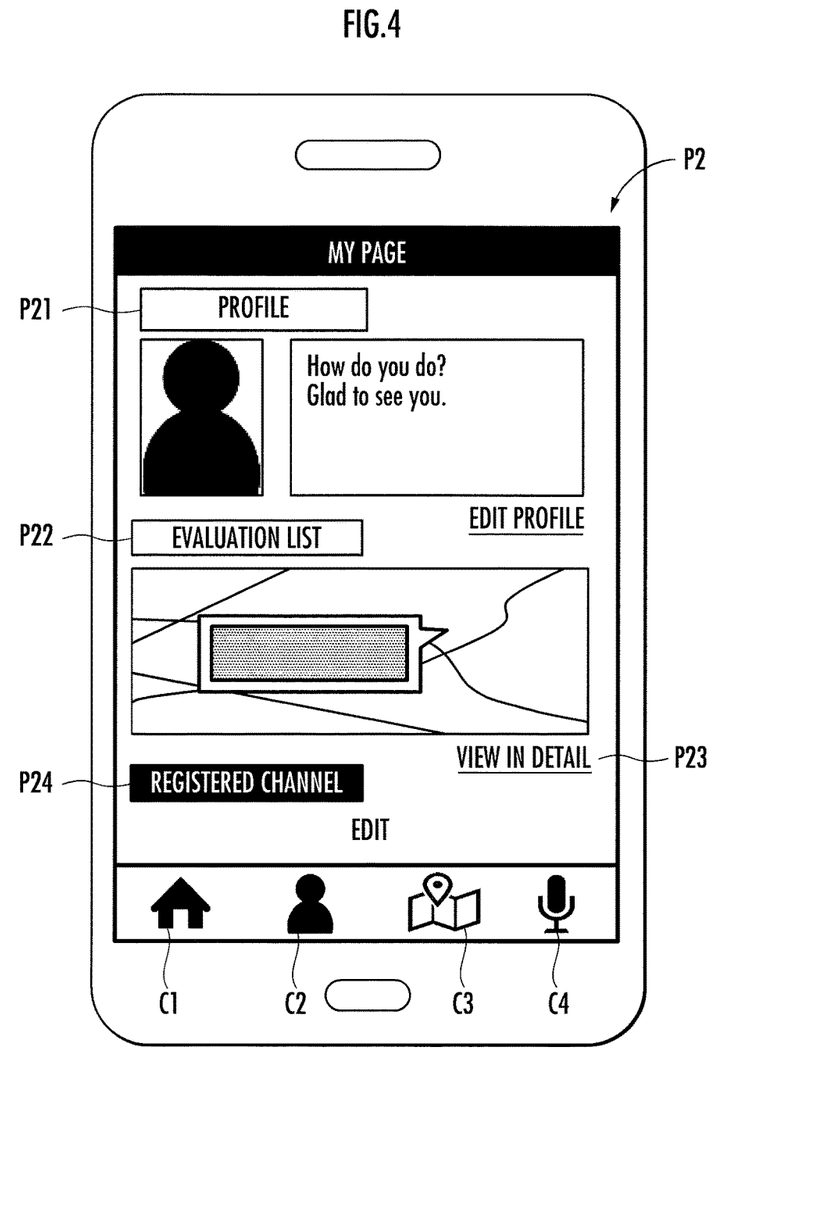
FIG. 4 is a diagram illustrating the configuration of a my page screen.

The my page button C2 is a button for transitioning to a my page screen P2 (FIG. 4).

Figure 6:
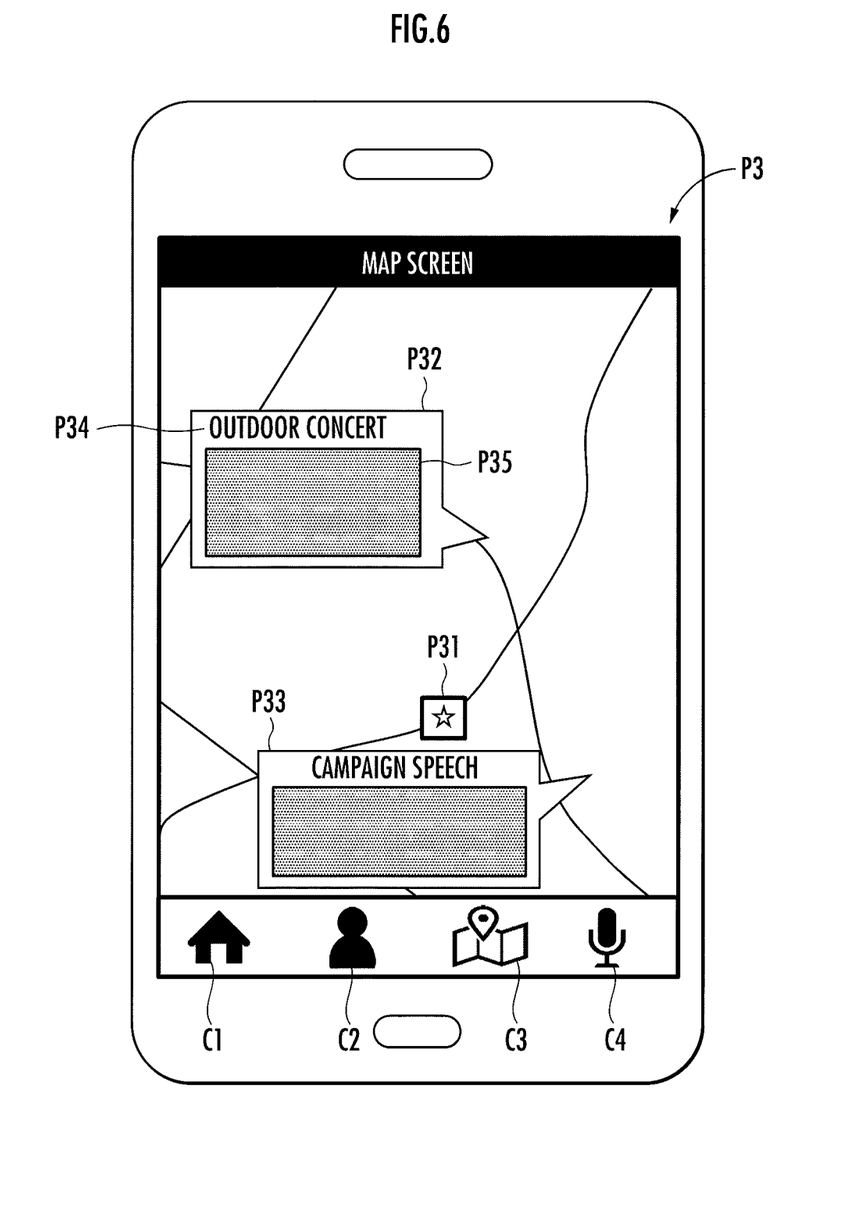
FIG. 6 is a diagram illustrating the configuration of a map screen.

The map button C3 is a button for transitioning to a map screen P3 (FIG. 6).

Figure 7:
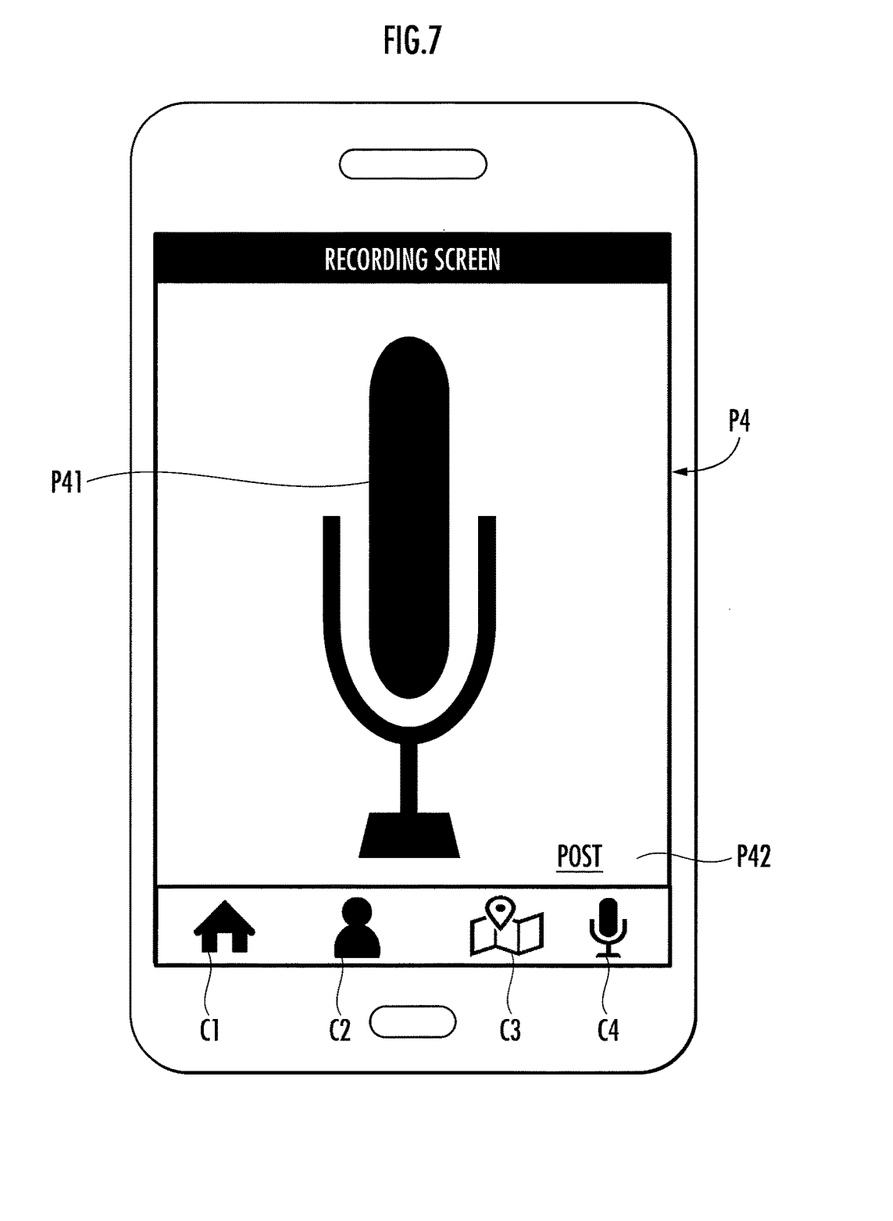
FIG. 7 is a diagram illustrating the configuration of a recording screen.

The recording switch C4 is a button for transitioning to a recording screen P4 (FIG. 7).

The my page screen P2 includes profile display P21, evaluation list display P22, and registered cannel display P24. As in the home screen P1, the home button C1, the my page button C2, the map button C3, and the recording switch C4 are included in a lower part of the my page screen P2.

The profile display P21 is display including an icon of the user of the client 2 or a profile of the user such as a greeting message.

The evaluation list display P22 is display in which post information contributed by the user of the client 2 in the past and evaluations of the other members concerning the post information are superimposed on a map and included. The evaluation list display P22 includes an evaluation check screen link P23. The evaluation check screen link P23 is a link for transitioning to an evaluation check screen P25 (FIG. 5).

Registered channel display P24 is display for editing of a registered channel displayed on the home screen.

Figure 5:
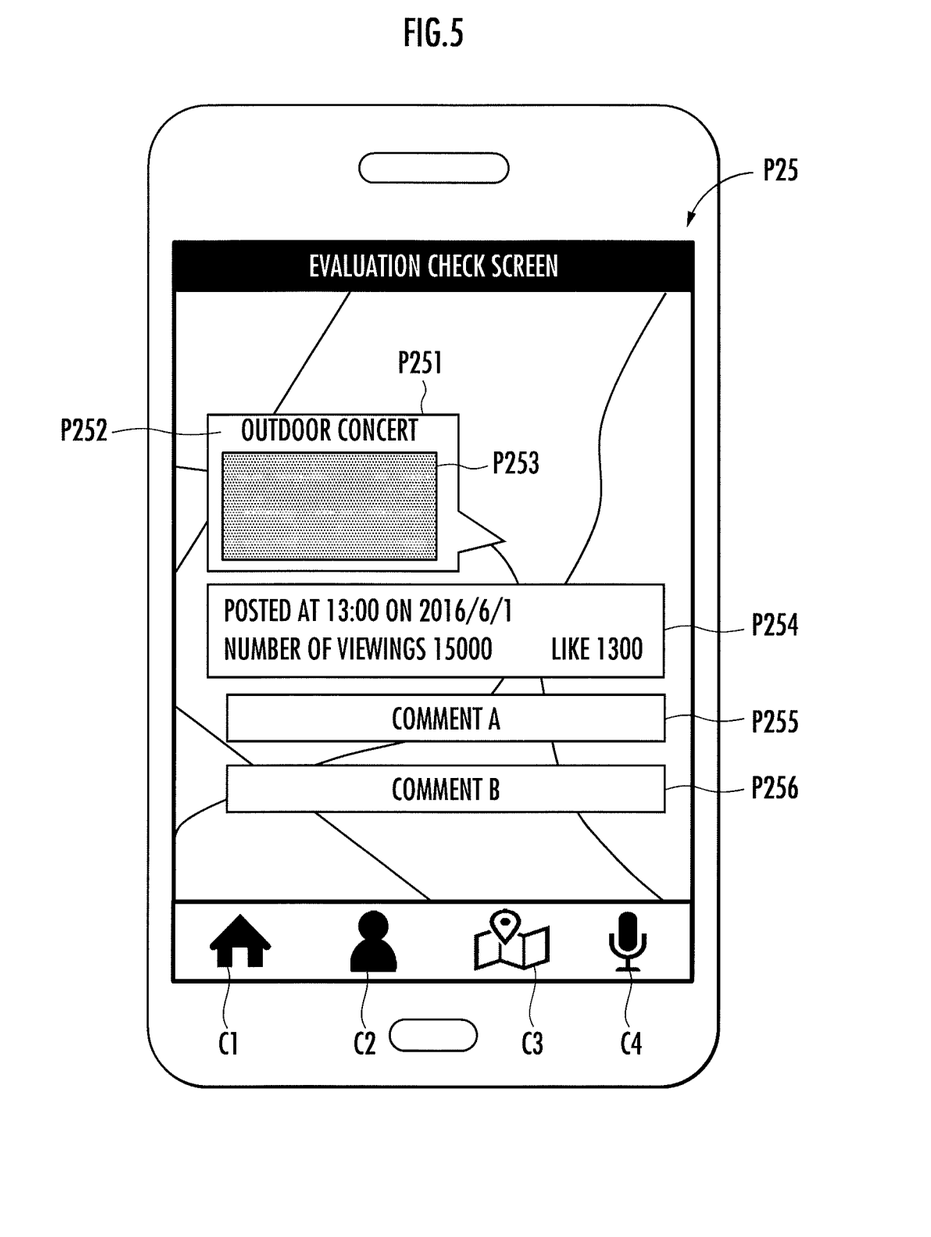
FIG. 5 is a diagram illustrating the configuration of an evaluation check screen.

The evaluation check screen P25 includes, as shown in FIG. 5, first information display P251, first information evaluation display P254, and comment displays P255 and P256. As in the home screen P1, the home button C1, the my page button C2, the map button C3, and the recording switch C4 are included in a lower part of the evaluation check screen P25.

The first information display P251 is display of first information contributed by the user. The first information display P251 includes title display P252 and contributed image display P253. The first information display P251 may include text display, a sound reproduction button, and a moving image reproduction button instead of or in addition to the title display P252 and the contributed image display P253.

The first information evaluation display P254 is display of evaluations concerning the first information by the other members. The first information evaluation display P254 includes a post date and time, the number of viewings, and the number of people who gave an affirmative evaluation (an evaluation of "Like"). The evaluation is not limited to the affirmative evaluation and may be an evaluation by evaluation standards such as "awesome" and "astonishing" or may be an evaluation in a plurality of stages (e.g., five stages).

The comment displays P255 and P256 are displays of comments concerning the first information by the other members.

As shown in FIG. 6, the map screen P3 includes position display P31 of the user and kinds of first information P32 and P33 on a map. As in the home screen P1, the home button C1, the my page button C2, the map button C3, and the recording switch C4 are included in a lower part of the map screen P3.

The position display P31 of the user is, for example, an icon superimposed and displayed in a position on the map corresponding to the present position of the client 2 received by a GPS receiver.

The kinds of first information P32 and P33 are first information contributed by the user or the other members superimposed on the map.

The kinds of first information P32 and P33 include title display P34 and image display P35.

The recording screen P4 includes, as shown in FIG. 7, recording display P41 indicating that recording is being performed and a link P42 to a post check screen P43 (see FIG. 8) for adding information (second information) that should be associated with the first information to recorded sound. As in the home screen P1, the home button C1, the my page button C2, the map button C3, and the recording switch C4 are included in a lower part of the recording screen P4.

Figure 8:
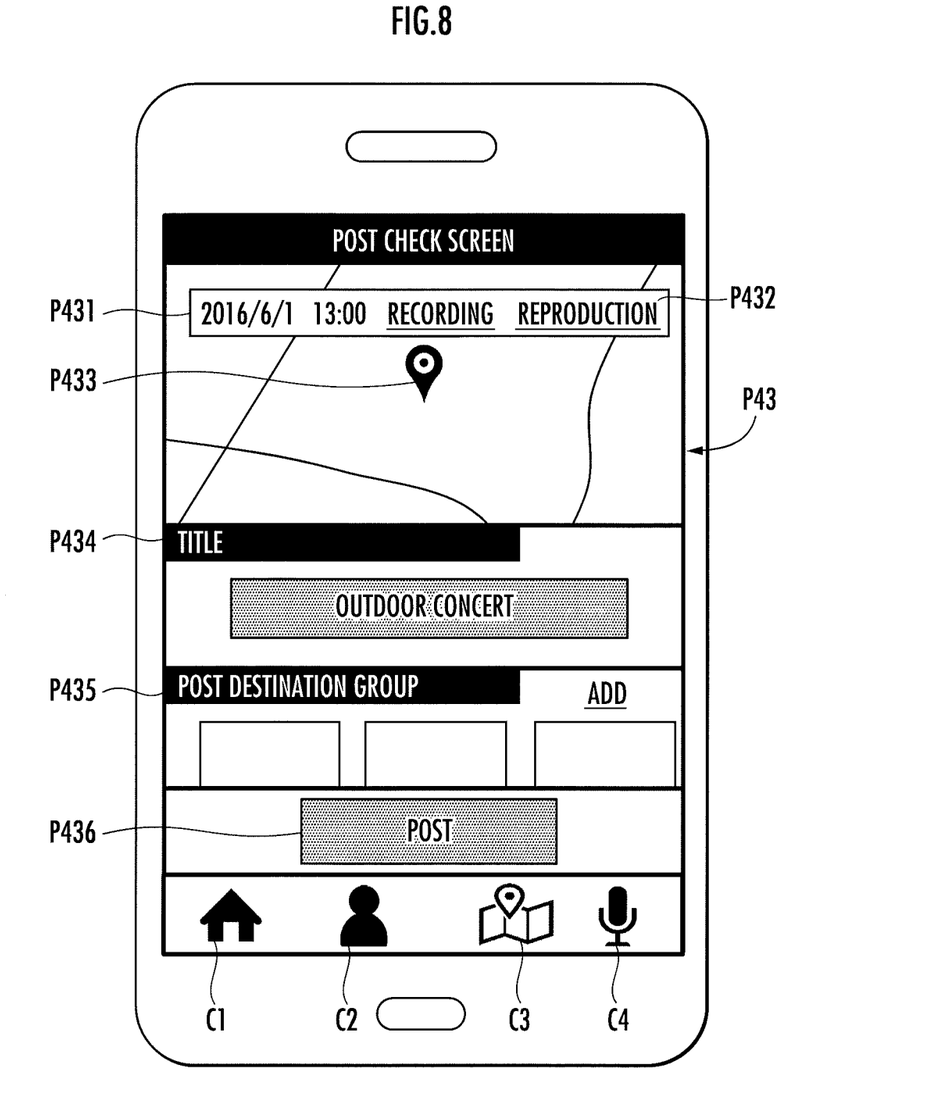
FIG. 8 is a diagram illustrating the configuration of a post check screen.

The post check screen P43 includes, as shown in FIG. 8, creation date and time display P431, post position display P433, a title editing field P434, a post destination group selection field P435, and a post button P436. As in the home screen P1, the home button C1, the my page button C2, the map button C3, and a recording switch C4 are included in a lower part of the post check screen P43.

The post check screen P43 is equivalent to the "interface" of the present invention. Another example of the interface" of the present invention may be an output of sound for requesting an input of the second information to a microphone or may be lighting or flashing in a predetermine form of a lamp.

When the input of the second information to the microphone is requested, after sound in a predetermined form, for example, "what is a title?" is reproduced, a term included in sound input to the microphone may be recognized as a title. By analyzing the sound input to the microphone, a term following the term "title" or a term preceding the term "title" may be recognized as the title.

The creation date and time display P431 is display of a creation date and time of the first information, for example, a recording date and time of the sound. The creation date and time display P431 includes a reproduction link P432 for reproducing recorded sound or the like.

The post position display P433 is display of a position of the moving body 3 (or the client 2) at the time when the sound is recorded. The post position display P433 includes display of information associated with the first information, for example, a title of the sound or a picked-up image.

The title editing field P434 is display for editing the title serving as the second information that should be associated with the first information.

The post destination group selection field P435 is display for selecting a sharing destination of the first information serving as the second information that should be associated with the first information.

The post check screen P43 may include an image indicating a start time point of an ON period, a start time point of an OFF period, and a time point when the user recognizes the first information, for example, an image indicating the time point when the user recognized the first information on a line segment having both ends at the start time point of the ON period and the start time point of the OFF period.

The output control unit 211 is connected to an apparatus mounted on the moving body 3 via the client communication unit 23 (FIG. 2/STEP 04).

The output control unit 211 determines whether an ON start condition that the present ON period of the moving body 3 is started is satisfied (FIG. 2/STEP 06). The processing in STEP 04 in FIG. 2 and STEP 06 in FIG. 2 may be executed in a state in which the SNS application is not started by the user.

The ON start condition is a condition that the present ON period of the moving body 3 is started, for example, a condition that a signal indicating that ignition of the moving body 3 is ON is received from the ignition switch sensor 311 of the moving body 3.

In addition to or instead of the condition, the ON start condition may include, for example, a condition that connection to an apparatus mounted on the moving body 3 is established. In addition to or instead of the condition, the ON start condition may include a condition that a position indicated by a signal received from the position sensor of the moving body 3 changes. The ON start condition may include a condition that the position of the client 2 or the position indicated by the signal received from the position sensor of the moving body 3 is on a road. Whether a certain position is on the road can be determined by, for example, map matching. In addition to or instead of the condition, the ON start condition may include a condition that speed of the moving body 3 indicated by a signal received from the speed sensor of the moving body 3 is equal to or higher than predetermined speed. In addition to or instead of the condition, the ON start condition may include a condition that speed of the moving body 3 indicated by a signal received from the gyro sensor of the moving body 3 is equal to or higher than the predetermined speed. In addition to or instead of the condition, the ON start condition may include a condition that an input of predetermined sound (e.g., engine sound or voice "driving start") to the client input unit 24 is detected.

If a result of the determination is negative (FIG. 2/NO in STEP 06), the output control unit 211 recognizes operation by the user via the client input unit 24 (FIG. 2/STEP 08).

The output control unit 211 displays a screen corresponding to the operation by the user recognized in STEP 08 in FIG. 2 (FIG. 2/STEP 10).

For example, if the operation by the user is touch operation on gourmet contents included in the play list display P11 on the home screen P1, the output control unit 211 outputs contents concerning a gourmet food (an explanation image, sound, moving image, or the like of the gourmet food) to the client output unit 25.

If the operation by the user is depressing operation of any one of the buttons C1 to C4, the output control unit 211 outputs a screen corresponding to the button to the client output unit 25.

After the processing in STEP 10 in FIG. 2, the output control unit 211 executes the processing in STEP 04 and subsequent steps in FIG. 2.

If the determination result in STEP 06 in FIG. 2 is affirmative (FIG. 2/YES in STEP 06), the client arithmetic processing unit 21 executes processing during driving explained below (FIG. 2/STEP 12).

Processing During Driving

The processing during driving is explained with reference to FIG. 9. The processing during driving is processing executed when the ON start condition is satisfied (FIG. 2/YES in STEP 06).

Figure 9:
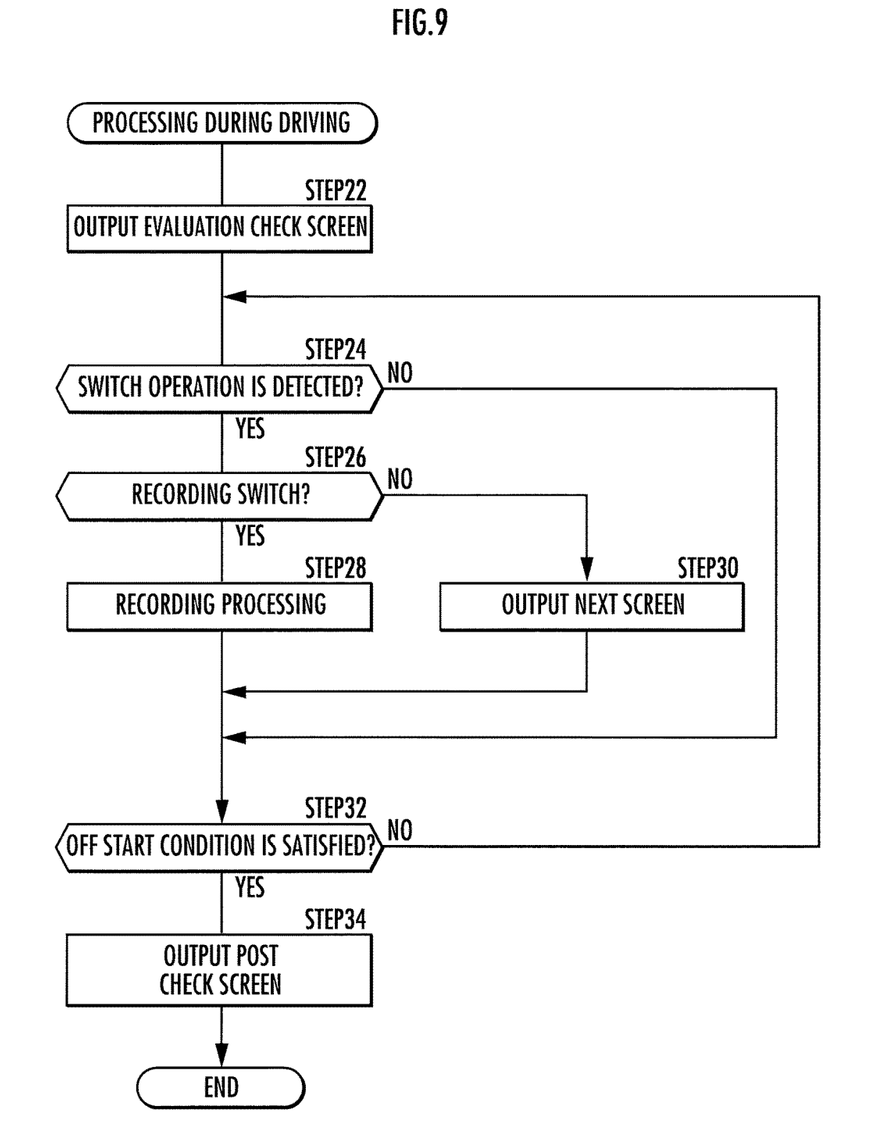
FIG. 9 is a flowchart of processing during driving.

The output control unit 211 outputs, to the client output unit 25, the evaluation check screen P25 (FIG. 5) concerning the first information contributed in the last ON period (FIG. 9/STEP 22). In addition to or instead of the evaluation check screen P25, the output control unit 211 may output, by sound, to the client output unit 25, evaluation by the other members concerning the first information contributed in the last ON period.

The information recognizing unit 212 determines whether depressing operation of any one of the switches of the moving body 3 is detected (FIG. 9/STEP 24).

If a result of the determination is negative (FIG. 9/NO in STEP 24), the output control unit 211 proceeds to STEP 32 in FIG. 9.

If the determination result is affirmative (FIG. 9/YES in STEP 24), the information recognizing unit 212 determines whether the detected depressing operation is depressing operation of the recording switch 322 (FIG. 9/STEP 26). The depressing operation of the recording switch 322 is equivalent to the "designation operation" of the present invention. Note that, in addition to or instead of the depressing operation of the recording switch 322, an utterance of a predetermined word such as "recording start" may be the "designation operation". In addition to or instead of the depressing operation of the recording switch 322, for example, depressing operation of an image pickup switch provided in the steering wheel may be detected.

If the determination result is affirmative (FIG. 9/YES in STEP 26), the information recognizing unit 212 outputs the recording screen P4 to the client output unit 25 and starts recording of sound via the client input unit 24 (FIG. 9/STEP 28). In addition to or instead of this, the information recognizing unit 212 may execute image pickup of a still image or a moving image of the inside or the outside of the moving body using a camera provided in the client 2. The information recognizing unit 212 may execute, via communication, the recording or the image pickup of a still image or a moving image on the inside or the outside of the moving body using a microphone or a camera provided in the moving body 3. The information recognizing unit 212 recognizes the position of the client 2 at a time point of the execution in FIG. 9/STEP 28.

Information recognized in STEP 28 in FIG. 9 is equivalent to the "first information" of the present invention.

After end operation of the recording by the user such as the depressing operation of the recording switch 322 performed again is detected, the information recognizing unit 212 ends the recording and proceeds to STEP 32 in FIG. 9.

If the determination result is negative (FIG. 9/NO in STEP 26), the output control unit 211 outputs the next screen of the screen currently displayed to the client output unit 25 (FIG. 9/STEP 30). In this embodiment, the output control unit 211 executes screen transition in the order of the home screen P1, the my page screen P2, the map screen P3, the home screen P1, and the like.

After STEP 28 in FIG. 9 and STEP 30 in FIG. 9, the output control unit 211 determines whether the OFF start condition is satisfied (FIG. 9/STEP 32).

The OFF start condition is a condition that the present OFF period of the moving body 3 is started and, for example, a condition that the ignition switch of the moving body 3 is OFF.

Instead of or in addition to the condition, the OFF start condition may include a condition that the position of the moving body 3 is the same for a fixed time or more. Instead of or in addition to the condition, the OFF start condition may include a condition that the position of the moving body 3 is within a predetermined distance from a destination. In addition to or instead of the condition, the OFF start condition may include a condition that an input of predetermined sound (e.g., sound during engine stop or voice "driving end" to the client input unit 24 is detected.

If the determination result in STEP 32 in FIG. 9 is negative (FIG. 9/NO in STEP 32), the client arithmetic processing unit 21 executes the processing in STEP 24 and subsequent steps in FIG. 9.

If the determination result in STEP 32 in FIG. 9 is affirmative (FIG. 9/YES in STEP 32), the client arithmetic processing unit 21 outputs the post check screen P43 (see FIG. 8) to the client output unit 25 for each of the kinds of information recognized in STEP 28 in FIG. 9 (FIG. 9/STEP 34). At this point, the client arithmetic processing unit 21 may automatically reproduce target information when depressing operation of the reproduction link P432 is detected or may automatically reproduce, without waiting for the depressing operation of the reproduction link P432, the target information, for example, when the post check screen P43 is displayed or when a predetermined time period elapses.

The client arithmetic processing unit 21 ends the processing during driving after STEP 34 in FIG. 9.

Action and Effect of the Processing During Driving

Action and effect of the processing during driving is explained with reference to FIG. 10.

Figure 10:
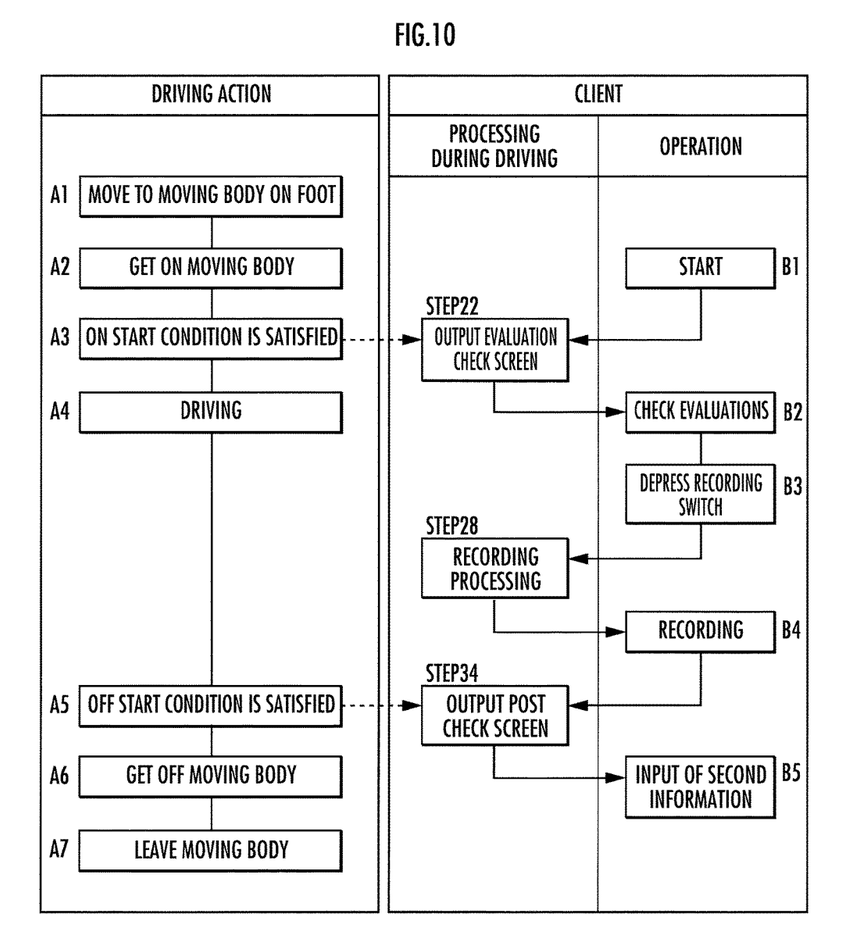
FIG. 10 is a diagram illustrating a flow of a driving action of a moving body, processing by a client, and operation on the client.

In general, in the driving of the moving body 3, a driver (a user) of the moving body 3 is considered to take a series of actions of moving to the moving body on foot (A1), getting on the moving body (A2), driving the moving body (A4), getting off the moving body after a driving end (A6), and leaving the moving body (A7) as shown in FIG. 10.

It is assumed that, for example, the user starts the SNS application installed in the carried client 2 before getting on the moving body 3 (B1).

If it is determined that the ON start condition is satisfied (A3, FIG. 2/YES in STEP 06), the processing during driving is started by the client arithmetic processing unit 21 (FIG. 2/STEP 12). An evaluation check screen is output to the client output unit 25 (FIG. 9/STEP 22). Consequently, it is possible to cause the user to check evaluations of a post of the user by the other members (B2).

As a result, it is possible to urge the user to perform an additional post. It is possible to urge the user to perform a spontaneous post action, for example, depressing operation of the recording switch 322 (B3).

When the depressing operation of the recording switch 322 is detected by the information recognizing unit 212 (FIG. 9/YES in STEP 24 and FIG. 9/YES in STEP 26), recording processing is executed (FIG. 9/STEP 28).

Consequently, the user can perform, during the driving, recording serving as the first information according to relatively simple operation (B4).

If it is determined by the output control unit 211 that the OFF start condition is satisfied (A5, FIG. 9/YES in STEP 32), the post check screen P43 is output to the client output unit 25 (FIG. 9/STEP 34).

Consequently, it is possible to urge the user to input the second information (information such as a title and a post destination group) to the first information (recorded sound) (B5).

In this way, it is possible to appropriately urge the user to contribute the first information and the second information while preventing the user from feeling annoyed.

Modified Form

The moving body 3 may periodically perform recording and image pickup separately from the designation operation using a microphone or a camera. Sound recorded by or an image picked up by the recording or the image pickup is equivalent to the "third information" of the present invention.

The server arithmetic processing unit 11 or the moving body 3 may be configured to execute a part or all of the functions of the output control unit 211 and the information recognizing unit 212 via communication.

The moving body 3 may include a moving-body output unit. The output control unit may output various kinds of information to the moving-body output unit via communication.

REFERENCE SIGNS LIST 3 moving body
25 output unit
211 output control unit
212 information recognizing unit

What is claimed is:

1. An information output system comprising:
a processor;
a memory; and
a program,
wherein the memory and the processor are configured to execute the program causing the information output system to output information;
recognize, according to designation operation by a user, first information and to recognize one or both of a location where the first information is recognized and a time point when the first information is recognized; and
cause, on condition that a present OFF period of a moving body is started, to output, in a form recognizable by the user, an interface for requesting an input of second information that should be associated with the first information recognized during a present ON period of the moving body before the present OFF period is started and information indicating one or both of the location and the time point.

2. The information output system according to claim 1, wherein the information output system is further caused to output, together with the interface for requesting the input of the second information, an image in which an image associated with the first information is superimposed and displayed at a position on a map corresponding to the location where the first information was recognized.

3. The information output system according to claim 1, wherein the information output system is further caused to output, together with the interface for requesting the input of the second information, an image indicating a start time point of the ON period, a start time point of the OFF period, and the time point when the first information was recognized.

4. The information output system according to claim 1, wherein the information output system is further caused to output, at the start of the present ON period of the moving body, an evaluation by another person concerning the first information recognized after a start of a previous ON period of the moving body.

5. The information output system according to claim 4, wherein
the information output system is further caused to recognize, together with the first information, the location where the first information was recognized, and
when the present ON period of the moving body is started, the information output system is caused to superimpose the first information and the evaluation by the other person in a position on a map corresponding to the location, and outputs the superimposed first information, evaluation, and map.

6. The information output system according to claim 1, wherein
the moving body includes a driving-operation detecting unit configured to detect driving operation, and a moving-body input unit disposed in a position where the user can operate when performing the driving operation and configured to detect the operation by the user, and
the designation operation is an operation with respect to the moving-body input unit.

7. The information output system according to claim 1, wherein
the first information is sound recorded or a still image or a moving image photographed according to the designation operation, and
the information output system is further caused to output, together with the interface for requesting the input of the second information, the first information automatically or according to operation by the user.

8. The information output system according to claim 1, wherein
the information output system is further caused to recognize, separately from the designation operation, third information different from the first information, and
the interface for requesting the input of the second information includes an interface for requesting association of the first information and the third information.

9. The information output system according to claim 1, wherein
the information output system is further caused to recognize a plurality of the first information according to the designation operation, and
the interface for requesting the input of the second information includes an interface for requesting association of each of the plurality of the first informations.

10. The information output system according to claim 1, further comprising an ignition switch sensor which outputs a signal indicating on or off of an ignition switch of the moving body,
wherein the information output system is further caused to recognize a start of an off period or a start of an on period based on the output of the ignition switch sensor.

11. The information output system according to claim 1, wherein the first information is sound recorded, and
wherein the second information is a title of the sound recorded or information identifying a sharing destination of the sound recorded.

12. An information output method executed by a system including an output unit configured to output information, the information output method comprising:
an information recognizing step for recognizing, according to designation operation by a user, first information and to recognize one or both of a location where the first information is recognized and a time point when the first information was recognized; and
an output control step for causing, on condition that a present OFF period of a moving body is started, the output unit to output, in a form recognizable by the user, an interface for requesting an input of second information that should be associated with the first information recognized after a start of during a present ON period of the moving body before the present OFF period is started and information indicating one or both of the location and the time point.

* * * * *